United States Patent
Evju et al.

(10) Patent No.: US 12,436,137 B2
(45) Date of Patent: Oct. 7, 2025

(54) SYSTEMS AND METHODS FOR MEMBRANE BLOCKAGE DETECTION IN GAS DETECTORS

(71) Applicant: Carrier Corporation, Palm Beach Gardens, FL (US)

(72) Inventors: Jon K. Evju, Shakopee, MN (US); Robert L. Fillmore, Bloomington, MN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 347 days.

(21) Appl. No.: 18/045,217

(22) Filed: Oct. 10, 2022

(65) Prior Publication Data
US 2023/0129686 A1   Apr. 27, 2023

Related U.S. Application Data

(60) Provisional application No. 63/262,982, filed on Oct. 25, 2021.

(51) Int. Cl.
G01N 33/00   (2006.01)

(52) U.S. Cl.
CPC ................... *G01N 33/007* (2013.01)

(58) Field of Classification Search
None
See application file for complete search history.

(56) References Cited

U.S. PATENT DOCUMENTS

| | | |
|---|---|---|
| 4,154,794 A | 5/1979 | Clyne |
| 5,099,396 A | 3/1992 | Barz et al. |
| 5,147,694 A | 9/1992 | Clarke |
| 5,373,102 A | 12/1994 | Ehrlich et al. |
| 5,761,053 A | 6/1998 | Robert et al. |
| 6,015,533 A | 1/2000 | Young et al. |
| 7,190,053 B2 | 3/2007 | Orth et al. |
| 7,326,862 B2 | 2/2008 | Lionetta et al. |

(Continued)

FOREIGN PATENT DOCUMENTS

CN   211291573 U   8/2020

OTHER PUBLICATIONS

Reinsch V E et al: "A new technique for the simultaneous, real-time measurement of membrane compaction and performance during exposure to high-pressure gas", Journal of Membrane Science, Elsevier BV, NL, vol. 171, No. 2, Jun. 1, 2000 (Jun. 1, 2000), pp. 217-228, XP004197036, ISSN:0376-7388, DOI: 10.1016 (Year: 2000).*

(Continued)

*Primary Examiner* — John E Breene
*Assistant Examiner* — Nigel H Plumb
(74) *Attorney, Agent, or Firm* — CANTOR COLBURN LLP

(57) ABSTRACT

A gas detector includes a membrane configured to define a sensing chamber of the gas detector; a strain sensor operatively connected to the membrane, the strain sensor configured for generating output signals related to strain in the membrane; and a controller operatively connected to the strain sensor, the controller configured to: determine a strain in the membrane based on the output signals; and determine a condition of the membrane based on the determined strain, wherein the determined condition indicates whether the membrane is blocked.

20 Claims, 3 Drawing Sheets

(56) References Cited

U.S. PATENT DOCUMENTS

| | | |
|---|---|---|
| 7,791,475 B2 | 9/2010 | Clow |
| 7,901,556 B2 | 3/2011 | Yamada |
| 8,963,021 B2 | 2/2015 | Lin |
| 9,354,214 B2 | 5/2016 | Sundal et al. |
| 10,788,457 B2 | 9/2020 | Miller et al. |
| 11,226,321 B2 | 1/2022 | Yosuke et al. |
| 2002/0090506 A1 | 7/2002 | Protzner et al. |
| 2013/0055793 A1 | 3/2013 | Karasuyama |
| 2017/0269044 A1* | 9/2017 | Diekmann ......... G01N 33/0073 |
| 2017/0363596 A1 | 12/2017 | Yosuke et al. |
| 2019/0243432 A1 | 8/2019 | Key et al. |
| 2020/0103318 A1 | 4/2020 | Yang et al. |
| 2020/0166495 A1 | 5/2020 | Stokoe |
| 2020/0363306 A1 | 11/2020 | Sexton |

OTHER PUBLICATIONS

European Search Report for Application No. 22202028.1, Issued Jun. 18, 2024, 7 Pages.

* cited by examiner

SYSTEMS AND METHODS FOR MEMBRANE BLOCKAGE DETECTION IN GAS DETECTORS

CROSS REFERENCE TO A RELATED APPLICATION

The application claims the benefit of U.S. Provisional Application No. 63/262,982 filed Oct. 25, 2021, the contents of which are hereby incorporated in their entirety.

BACKGROUND

The invention relates generally to membrane blockage detection and, more specifically, to membrane blockage detection in gas detectors.

Gas detectors may generally use weather shields to protect sensors from the environment (e.g., liquids, dirt, debris, etc.). Some weather shields may include a hydrophobic membrane that allows gas to flow through while still blocking water. However, the hydrophobic membrane may become blocked or clogged with dust and debris, which may impede gas detection on gas detectors.

BRIEF DESCRIPTION

Aspects of the disclosure relate to methods, apparatuses, and/or systems for membrane blockage detection.

In some embodiments, a gas detector is provided. In some embodiments, the gas detector comprises a membrane configured to define a sensing chamber of the gas detector. The gas detector further comprises a strain sensor operatively connected to the membrane, the strain sensor configured for generating output signals related to strain in the membrane. The gas detector comprises a controller operatively connected to the strain sensor. The controller is configured to: determine a strain in the membrane based on the output signals; and determine a condition of the membrane based on the determined strain, wherein the determined condition indicates whether the membrane is blocked.

In some embodiments, a plurality of strain sensors are employed. The sensors may be located inside, as well as on the outside of the membrane.

In some embodiments, the strain sensor readings are used in a comparative manner.

In some embodiments, presence of blockage in the membrane may be determined responsive to the determined strain, or comparative strain being above a strain threshold.

In some embodiments, the strain threshold may be determined based on the porosity of the membrane.

In some embodiments, the controller is further configured to determine an amount of blockage of the membrane based on the determined strain.

In some embodiments, the controller is further configured to determine a remaining operational life of the membrane based on the determined strain.

In some embodiments, the controller is configured to send an alert to a user, the alert indicating the condition of the membrane.

In some embodiments, the strain sensor comprises a resistive conductor operatively connected to the outer surface of the membrane.

In some embodiments, the conductor is glued, printed on, pressed on, woven in, embedded in, or otherwise connected to the outer surface of the membrane.

In some embodiments, the conductor is placed around at least a portion of the outer surface of the membrane in a zig-zag manner.

In some embodiments, a method for detecting membrane blockage in a gas detector is disclosed. In some embodiments, the gas detector comprises a membrane defining a sensing chamber of the detector, and a strain sensor. The method comprises generating, with the strain sensor, output signals related to membrane strain; determining a strain in the membrane based on the output signals; and determining a condition of the membrane based on the determined strain change, wherein the determined condition indicates whether the membrane is blocked.

In some embodiments, the determined condition indicates whether the membrane is ruptured or missing.

In some embodiments, presence of blockage in the membrane is determined responsive to the determined strain being above a strain threshold.

In some embodiments, the strain threshold is determined based on porosity of the membrane.

In some embodiments, the method further comprises determining an amount of blockage of the membrane based on the determined strain.

In some embodiments, the method further comprises determining a remaining operational life of the membrane based on the determined strain.

In some embodiments, the method further comprises sending an alert to a user, the alert indicating the condition of the membrane.

In some embodiments, the strain sensor comprises a resistive conductor operatively connected to the outer surface of the membrane.

In some embodiments, the conductor is glued, printed on, pressed on woven in, embedded in, or otherwise connected to the outer surface of the membrane.

In some embodiments, the conductor is placed around at least a portion of the outer surface of the membrane in a zig-zag manner.

Various other aspects, features, and advantages of the invention will be apparent through the detailed description of the invention and the drawings attached hereto. It is also to be understood that both the foregoing general description and the following detailed description are examples and not restrictive of the scope of the invention.

DETAILED DESCRIPTION

Figure 1:
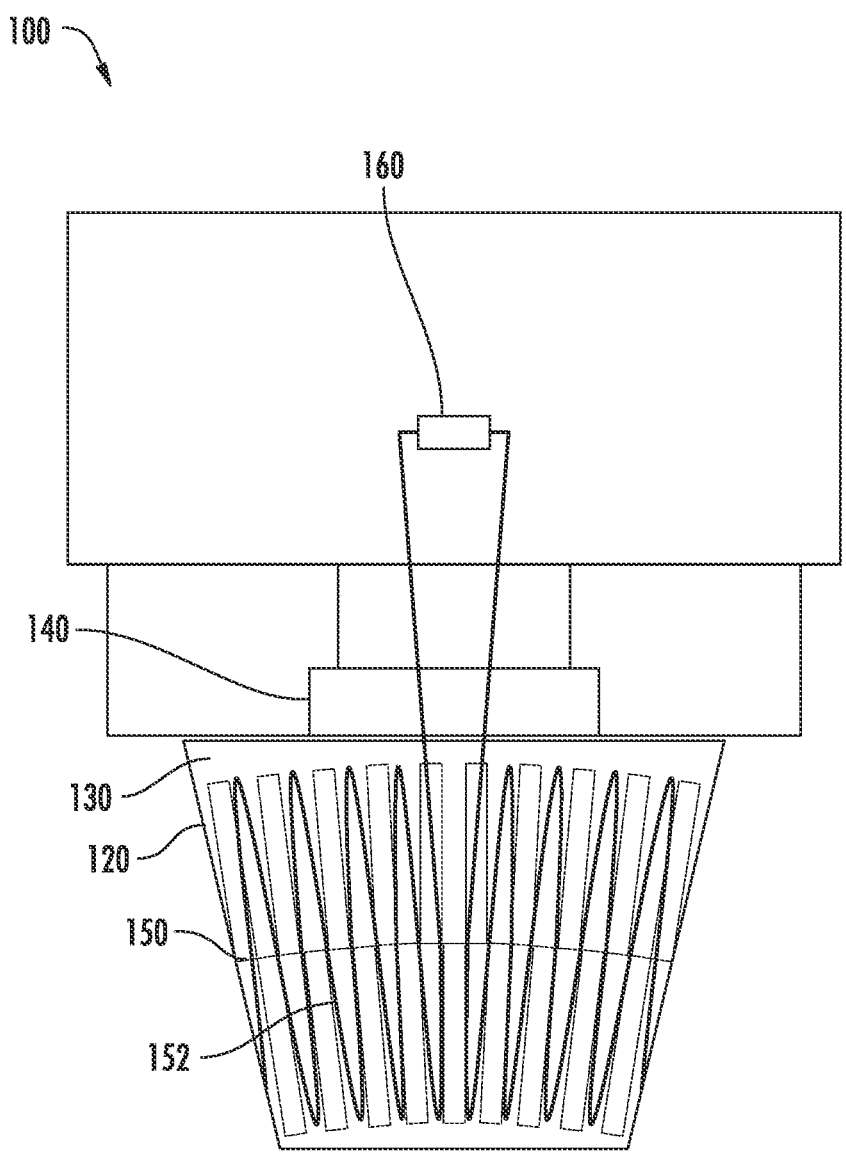
FIG. 1 is a perspective side view of an example of a gas detector, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

The present disclosure, in accordance with some embodiments, describes methods and systems for detecting membrane blockage in gas detectors. In some embodiments, gas sensors may include a weather shield meant to protect the sensor interface of the gas sensor from the environment (e.g., water, dust, debris, etc.) that may affect the sensor performance. In some cases, weather shields may include a membrane that defines a sensing chamber where the gas sensing interface is located. The membrane may be configured to allow gas to flow through, but blocks liquids (e.g., water) from reaching the gas sensing interface. The membrane may get dirty or clogged which may prevent the gas from flowing into the sensing chamber and from reaching the gas sensing interface.

The present disclosure, in some embodiments, describes methods and systems for detecting membrane blockage or physical damage. In some embodiments, membrane blockage may be detected by measuring strain on the membrane caused by accumulated elements (e.g., liquids, dust, dirt, debris, etc.) on the surface of the membrane. For example, a change in strain measurements on the outer surface of the membrane may be indicative of blockage. Similarly, a comparison of strain on the outer surface and the inner surface may be indicative of blockage (since the inner surface is less exposed to the environment than the outer surface). In some embodiments, a strain sensor may be used to measure strain on the membrane. The strain sensor may be a strain gage or any device capable of detecting strain change in the membrane. The measurements of extreme or erratic values may be indicative of physical damage to the membrane. The present disclosure describes, herein below, examples of strain sensors that may be used. However, this is for illustrative purposes only and is not intended to be limiting. Other types of strain sensors may be used and are consistent with the present disclosure. The methods and systems in the present disclosure may be beneficial because the use of strain measurements to detect small changes in the membrane shape which may be indicative of blockage. This may allow users to remotely monitor gas detectors to detect if the detector membrane is clean, or if it is becoming blocked, needing to be cleaned or changed out. With this advance warning, the end-user may schedule maintenance to clean or replace the hydrophobic membrane prior to failure and reduce costly down-time or gas detector failures due to blocked membranes.

FIG. 1 is a perspective side view of an example of a gas detector 100, in accordance with one or more embodiments. In some embodiments, gas detector 100 may include a membrane 120, a gas sensing interface 140, and a strain sensor 150. In some embodiments, gas detector 100 may include a controller 160 operatively connected to one or more components of gas detector 100. In some embodiments, controller 160 may be configured to control one or more operations of gas detector 100. In some embodiments, controller 160 may include one or more processors configured to execute instructions stored on a memory to perform one or more operations of gas detector 100 described herein. Other components known to one of ordinary skill in the art may be included in controller 160 or in gas detector 100 to gather, process, transmit, receive, acquire, and provide information used in conjunction with the disclosed embodiments.

In some embodiments, membrane 120 may be configured to form a sensing chamber 130 where gas sensing interface 140 is located. In some embodiments, membrane 120 may be a porous membrane, that acts as a barrier, and is configured to allow gas to flow into sensing chamber 130 and reach gas sensing interface 140 while filtering out other elements (e.g., liquids, dust, debris, etc.). The permeability (number and size of the pores) of membrane 120 may depend on type of gas the gas detector 100 is configured to detect (e.g., different membranes with different permeabilities may be used in different gas detectors, depending on the gas to be detected). In some embodiments, membrane 120 may be a hydrophobic membrane configured to repel and prevent liquids (e.g., water) from reaching sensing chamber 130. In some embodiments, membrane 120 may be flexible. For example, membrane 120 may contract, expand, flex, or change shape as a result of accumulated elements (e.g., liquids, dust, debris, dirt, etc.) or applied force on one or more walls of its surfaces.

Strain sensor 150 may be configured to generate output signals related to strain on membrane 120. For example, strain sensor 150 may be configured to measure the strain changes caused by accumulation of elements (e.g., liquids, dust, dirt, debris, etc.) on one or more walls of membrane 120. In some embodiments, strain sensor 150 may be operatively connected to membrane 120 and controller 160. In some embodiments, strain sensor 150 may include a resistive conductor 152 operatively connected to the outer surface of membrane 120. For example, conductor 152 may be glued, printed on, pressed on woven in, embedded in, or otherwise connected to the outer surface of membrane 120. In some embodiments, conductor 152 may be placed around the outer surface (or around a portion of the outer portion) in a zig-zag manner (as shown in FIG. 1). In some embodiments, accumulation of dirt on membrane 120 may cause the membrane to stretch which in turn may cause conductor 152 to stretch. Resistance and/or impedance of conductor 152 may increase as a result of stretching. Similarly, accumulation of dirt on membrane 120 may cause the membrane to contract which in turn may cause conductor 152 to compress. In these cases, resistance (or impedance) of conductor 152 may decrease as a result of compressing. Strain on membrane 120 may be determined based on the measured electrical resistance of the conductor 152. In some embodiments, the membrane may be determined to be blocked if the measured strain reaches (e.g., at or above) a predetermined strain threshold.

FIG. 1 shows a strain sensor 150 having a single wire conductor 152. However, this is for illustrative purposes only and is not intended to be limiting. Other types of strain sensors may be used and are consistent with the present disclosure. For example, in some embodiments, strain sensor 150 may include a second resistive wire conductor placed on the inner surface of membrane 120. In these embodiments, a difference in strain measurements from the resistive wire on the outer surface and the resistive wire on the inner surface may be indicative of whether the membrane is blocked. For example, membrane 120 may be clogged if the difference between the outer and inner surfaces strain measurements reaches a pre-determined value.

Figure 2:
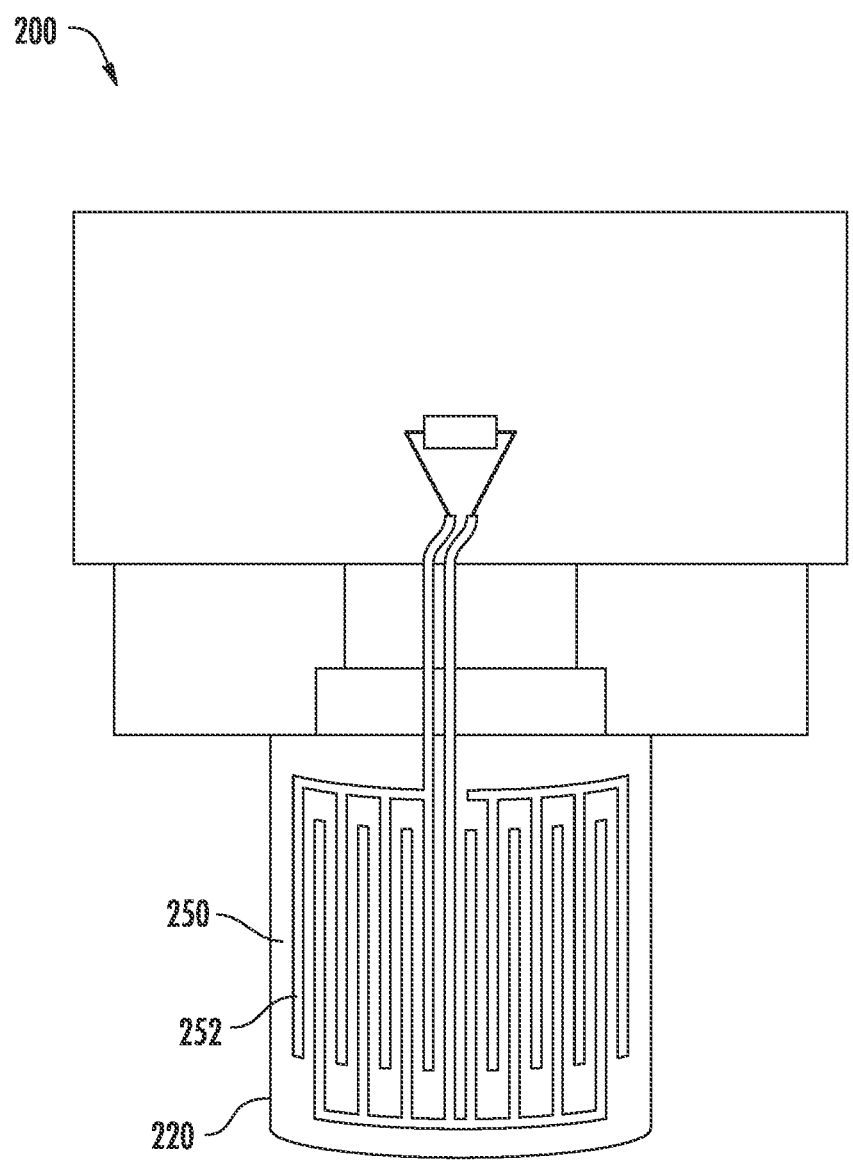
FIG. 2 a perspective side view of an example of a gas detector, in accordance with one or more embodiments.

In some embodiments, as shown in FIG. 2, the strain sensor 250 may include a series of interdigitated electrodes 252 arranged around the membrane (or around a portion of the membrane). In some embodiments, a voltage may be applied to the electrodes to determine their capacitance. In some embodiments, a change in the shape of membrane 220 (e.g., contraction or stretch) may cause changes in distances between the electrodes which in turn causes the capacitance of electrodes 252 to increase or decrease. In some embodiments, changes in the capacitance of electrodes 252 may be indicative of whether the membrane is clogged. The measure of capacitance may further be used to determine strain on the membrane. For example, membrane 220 may be clogged if the difference between the outer and inner surfaces strain measurements reaches a pre-determined value. In some embodiments, a set of electrodes 252 may be placed on the outer surface of membrane 220 and a second set of electrodes may be placed on the inner surface of membrane 220. In these embodiments, a difference in strain measurements on the outer surface and the inner surface may be indicative of whether the membrane is blocked. For example, membrane 120 may be clogged if the difference between the outer and inner surfaces strain measurements reaches a pre-determined value.

Returning to FIG. 1, controller 160 may be configured to control one or more operations of gas detector 100. In some embodiments, controller 160 is operatively connected to membrane 120, strain sensor 150, sensing interface 140, and/or other components of gas detector 100. In some embodiments, controller 160 may control operations of strain sensor 160. For example, controller 160 may activate sensor 150. In some embodiments, some, or all operations of control electronics of strain sensor 150 may be done by controller 160. In some embodiments, controller 160 may be configured to determine a membrane strain of membrane 120 based on output signals from strain sensor 150. For example, controller 160 may determine resistance, and/or impedance of the resistive conductor 152 based on output signals from sensor 150 and determine the membrane strain based on the determined resistance and/or impedance.

In some embodiments, controller 160 may be configured to determine a strain change in membrane 120 based on the determined membrane strain. For example, controller 160 may be configured to determine membrane strain change by comparing strain of membrane 120 with previous strain measurements (e.g., when membrane 120 was clean, when gas detector was first installed, or when membrane was serviced, etc.). In some embodiments, where conductors are placed on either side of the membrane (outer surface and inner surface), controller 160 may be configured to determine membrane strain change by comparing strain of the outer surface with strain of the inner surface.

In some embodiments, controller 160 may be configured to determine a condition of membrane 120. For example, controller 160 may be configured to determine whether membrane 120 is clean, dirty, clogged, damaged, missing, etc. In some embodiments, controller 160 may be configured to determine a condition of membrane 120 based on the measured (or determined) membrane strain of membrane 120. In some embodiments, controller 160 may determine presence of blockage (e.g., caused by debris, liquids, or dirt on the membrane) responsive to the membrane strain reaching a strain threshold. In some embodiments, the threshold strain may be determined by the manufacturer, a user, or controller 160. In some embodiments, the strain threshold may be determined based on one or more of the type of gas detector, type of membrane (e.g., porosity), type of gas inside the chamber, membrane condition, and previous strain measurements.

In some embodiments, controller 160 may be configured to determine the condition of membrane 120 based on strain change. For example, in these embodiments, controller 160 may determine a first membrane strain (e.g., when membrane is clean). Controller 160 may subsequently determine the change in strain (e.g., via subsequent one or more membrane strain measurements) and determine the condition of the membrane based on the strain change. In some embodiments, controller 160 may determine that membrane 120 is clogged (or damaged or missing) responsive to the determined strain change reaching a strain change threshold.

In some embodiments, the strain change threshold may be determined based on one or more the type of gas detector, type of membrane (e.g., porosity), type of gas inside the chamber, membrane condition, and previous strain measurements.

In some embodiments, controller 160 may be configured to determine the condition of membrane 120 based on strain change between the outer surface and inner surface (e.g., in cases where resistive conductors are placed on inner and outer surface of membrane 120). For example, in these embodiments, controller 160 may determine an outer surface strain, and determine whether the membrane based on a difference between the outer and inner surfaces strains. In some embodiments, controller 160 may determine that membrane 120 is clogged (or damaged or missing) responsive to the determined difference in the outer and inner surfaces strains reaching a surface strain threshold value. In some embodiments, the surface strain threshold value may be determined based on one or more the type of gas detector, type of membrane (e.g., porosity), type of gas inside the chamber, membrane condition, and previous strain measurements.

In some embodiments, controller 160 may be configured to determine (or estimate) an amount of blockage of the membrane based on the determined membrane strain (or strain change). In some embodiments, controller 160 may be configured to determine (or estimate) a remaining operational life of the membrane based on the determined strain, strain change, amount of blockage, and/or the membrane condition. For example, controller 160 may indicate whether or when the membrane should be cleaned or replaced based the determined strain.

In some embodiments, controller 160 may be configured to automatically activate strain sensor 150 (by applying a voltage/current through the conductor) to measure strain on membrane 120. The controller 160 may activate strain sensor 150 periodically to check (or test) for blockage in the membrane. For example, the controller may check for blockage on pre-determined schedule, on demand (e.g., locally, or remotely via a communication network), or based on previous test results. For example, if the strain measurements or the amount of blockage determined during a previous test is outside of a defined range, the controller 160 may be configured to change testing schedule (e.g., may check for blockage before a pre-scheduled test). Similarly, if the strain measurements or the amount of blockage determined during a previous test is within or below a defined range, the controller may skip a scheduled check for blockage.

In some embodiments, controller 160 may be configured to generate a feedback or alert including one or more of the strain measurements, a condition of the membrane, determination of whether the membrane is blocked, the amount of blockage, or an estimation of remaining operational life of the membrane. In some embodiments, the feedback may be displayed on a display of the gas detector. In some embodiments, controller 160 may generate an alarm (e.g., audible, or visual alarm) responsive to determining the condition of the membrane (e.g., lights, or alarm sounds). In some embodiments, different types of alarms may be used based on the condition of the membrane. For example, green light if the membrane is clean, yellow if it's blocked, red light it's torn or missing, etc. Similarly, different audible alarms (e.g., in volume, duration, intensity, etc.) may be based on the condition of the membrane. In some embodiments, the feedback/alert may be sent to a user device (e.g., via a communication network) which may allow users to remotely monitor operations of the gas detector (e.g., detecting the condition of the membrane). In some embodiments, controller 160 may be configured to communicate with a maintenance scheduling system to trigger a maintenance call based on the determined condition of the membrane. With this advance warning, the end-user may schedule maintenance to replace the membrane prior to failure and reduce costly down-time or gas detector failures due to blocked membranes.

Figure 3:
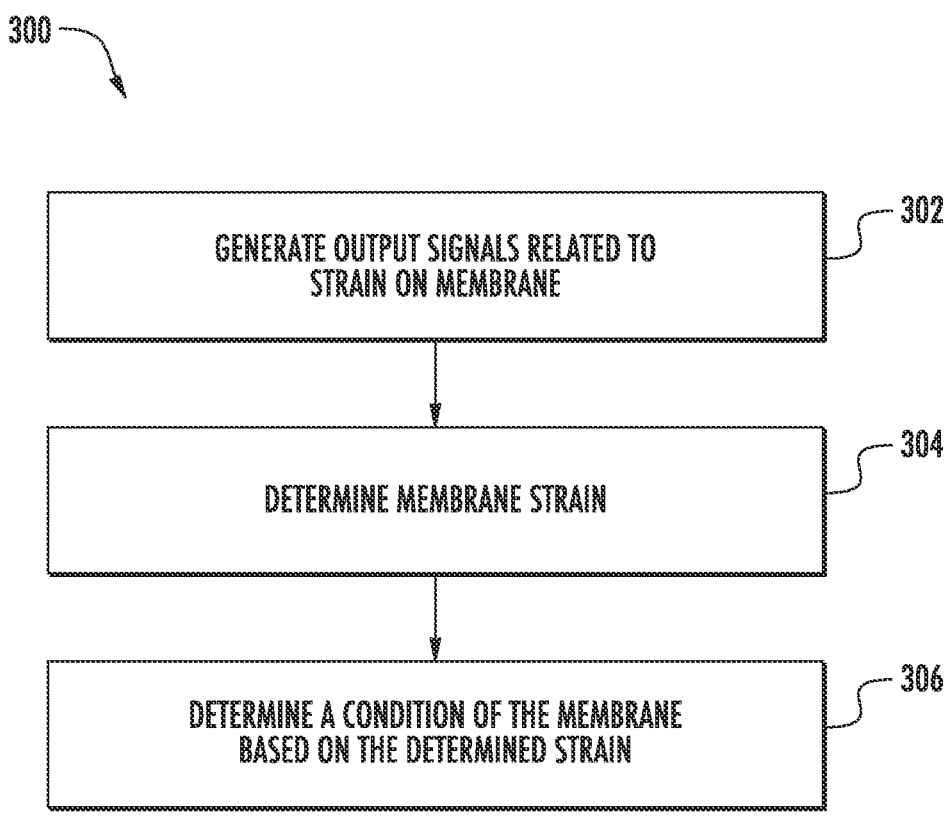
FIG. 3 shows a flow diagram illustrating an example of a method for detecting membrane blockage in a gas detector, in accordance with one or more embodiments.

FIG. 3 shows a flow diagram illustrating an example of a method 300 for detecting membrane blockage in a gas detector, in accordance with one or more embodiments of the present disclosure. In some embodiments, the gas detector comprises a membrane defining a sensing chamber of the detector, and a strain sensor (e.g., as described above).

At an operation 302 of method 300, one or more output signals related to membrane strain may be generated. In some embodiments, operation 302 may be performed by a strain sensor the same as or similar to strain sensor 150 (shown in FIG. 1 and described herein).

At an operation 304 of method 300, a membrane strain may be determined. In some embodiments, operation 304 may be performed by a controller the same as or similar to controller 160 (shown in FIG. 1 and described herein).

At an operation 306 of method 300, a condition of the membrane may be determined based on the determined membrane strain. In some embodiments, operation 306 may be performed by controller the same as or similar to controller 160 (shown in FIG. 1 and described herein).

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every.

What is claimed is:

1. A gas detector comprising:
   a membrane configured to define a sensing chamber of the gas detector;
   a strain sensor operatively connected to the membrane, the strain sensor configured for generating output signals related to strain in the membrane; and
   a controller operatively connected to the strain sensor, the controller configured to:
   determine a strain in the membrane based on the output signals; and
   determine a condition of the membrane based on the determined strain, wherein the determined condition indicates whether the membrane is blocked.

2. The gas detector of claim 1, wherein presence of blockage in the membrane is determined responsive to the determined strain being above a strain threshold.

3. The gas detector of claim 2, wherein the strain threshold is determined based on the porosity of the membrane.

4. The gas detector of claim 2, wherein the controller is further configured to:
   determine an amount of blockage of the membrane based on the determined strain.

5. The gas detector of claim 1, wherein the controller is further configured to:
   determine a remaining operational life of the membrane based on the determined strain.

6. The gas detector of claim 1, wherein the controller is configured to:
   send an alert to a user, the alert indicating the condition of the membrane.

7. The gas detector of claim 1, wherein the strain sensor comprises a resistive conductor physically connected to the outer surface of the membrane.

8. The gas detector of claim 7, wherein the conductor is glued, printed on, pressed on woven in, embedded in, or otherwise connected to the outer surface of the membrane.

9. A gas detector comprising:
   a membrane configured to define a sensing chamber of the gas detector;
   a strain sensor operatively connected to the membrane, the strain sensor configured for generating output signals related to strain in the membrane; and a controller operatively connected to the strain sensor, the controller configured to:
determine a strain in the membrane based on the output signals; and
determine a condition of the membrane based on the determined strain, wherein the determined condition indicates whether the membrane is blocked;
wherein the strain sensor comprises a resistive conductor operatively connected to the outer surface of the membrane;
wherein the conductor is placed around at least a portion of the outer surface of the membrane in a zig-zag manner.

10. A method for detecting membrane blockage in a gas detector comprising a membrane defining a sensing chamber of the detector, and a strain sensor, the method comprising:
generating, with the strain sensor, output signals related to membrane strain;
determining a strain in the membrane based on the output signals; and
determining a condition of the membrane based on the determined strain change, wherein the determined condition indicates whether the membrane is blocked.

11. A method for detecting membrane blockage in a gas detector comprising a membrane defining a sensing chamber of the detector, and a strain sensor, the method comprising:
generating, with the strain sensor, output signals related to membrane strain;
determining a strain in the membrane based on the output signals; and
determining a condition of the membrane based on the determined strain change, wherein the determined condition indicates whether the membrane is blocked;
wherein the determined condition indicates whether the membrane is ruptured or missing.

12. The method of claim 10, wherein presence of blockage in the membrane is determined responsive to the determined strain being above a strain threshold.

13. The method of claim 12, wherein the strain threshold is determined based on porosity of the membrane.

14. The method of claim 10, further comprising:
determining an amount of blockage of the membrane based on the determined strain.

15. The method of claim 10, further comprising:
determining a remaining operational life of the membrane based on the determined strain.

16. The method of claim 10, further comprising:
sending an alert to a user, the alert indicating the condition of the membrane.

17. The method of claim 10, wherein the strain sensor comprises a resistive conductor physically connected to the outer surface of the membrane.

18. The method of claim 17, wherein the conductor is glued, printed on, pressed on woven in, embedded in, or otherwise connected to the outer surface of the membrane.

19. The method of claim 17, wherein the conductor is placed around at least a portion of the outer surface of the membrane in a zig-zag manner.

20. A gas detector comprising:
a membrane configured to define a sensing chamber of the gas detector;
a strain sensor operatively connected to the membrane, the strain sensor configured for generating output signals related to strain in the membrane; and
a controller operatively connected to the strain sensor, the controller configured to:
determine a strain in the membrane based on the output signals; and
determine a condition of the membrane based on the determined strain, wherein the determined condition indicates whether the membrane is ruptured or missing.

* * * * *